(12) United States Patent
Axelrod et al.

(10) Patent No.: US 8,124,156 B2
(45) Date of Patent: Feb. 28, 2012

(54) PROCESSES FOR FORMING MULTI-LAYERED PET TREATS

(75) Inventors: Glen S. Axelrod, Colts Neck, NJ (US); Ajay Gajria, Monmouth, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 984 days.

(21) Appl. No.: 11/747,132

(22) Filed: May 10, 2007

(65) Prior Publication Data

US 2007/0264415 A1 Nov. 15, 2007

Related U.S. Application Data

(63) Continuation-in-part of application No. 11/372,992, filed on Mar. 10, 2006, now Pat. No. 7,851,001.

(51) Int. Cl.
*A23K 1/00* (2006.01)
(52) U.S. Cl. .......... 426/512; 426/515; 119/709
(58) Field of Classification Search .......... 426/512, 426/514–516, 132, 805; 425/576, 588; 119/709–711; 264/328.1, 328.2, 328.12, 264/238.8; *A23K 1/00*
See application file for complete search history.

(56) References Cited

U.S. PATENT DOCUMENTS

| | | | |
|---|---|---|---|
| 2,915,957 A * | 12/1959 | Bowman | 99/323.4 |
| 3,916,029 A | 10/1975 | Hildebolt | |
| 3,922,353 A | 11/1975 | Bernotavicz | |
| 4,006,266 A | 2/1977 | Bone et al. | |
| 4,076,846 A | 2/1978 | Nakatsuka et al. | |
| 4,260,635 A | 4/1981 | Fisher | |
| 4,307,057 A | 12/1981 | Hettinga | |
| 4,364,925 A | 12/1982 | Fisher | |
| 4,397,806 A | 8/1983 | Hettinga | |
| 4,574,690 A | 3/1986 | Chiao et al. | |
| 4,613,475 A | 9/1986 | Hettinga | |
| 4,777,058 A | 10/1988 | Chanler et al. | |
| 4,900,572 A | 2/1990 | Repholz et al. | |
| 4,954,061 A | 9/1990 | Repholz et al. | |
| 5,449,281 A | 9/1995 | Duport et al. | |
| 5,532,010 A | 7/1996 | Spanier et al. | |

(Continued)

OTHER PUBLICATIONS

Hartz Dental Chew 'N Clean Teething Ring Dog Toy. www.hartz.com, Mar. 3, 2006 (1 page).

(Continued)

*Primary Examiner* — Drew E Becker
*Assistant Examiner* — Steven Leff
(74) *Attorney, Agent, or Firm* — Grossman, Tucker, Perreault & Pfleger, PLLC

(57) ABSTRACT

A process for manufacturing a multi-layer pet treat or animal chew comprising the indexing of a moveable mold portion into alignment with the first of a plurality of stationary mold portions fed a first composition by a first injection molding unit to form a first layer in a cavity space formed by the aligned mold portions. The moveable mold portion and the first layer may be indexed to align with a second of a plurality of stationary mold portions fed a second composition by a second injection molding unit to form a second layer over said first in the cavity space formed by the aligned mold portion. The compositions fed by the first and second injection molding units may both be edible. In a further aspect, multi-component pet treats may be provided formed from two materials which may be different in physical, optical, sensual, nutritional or compositional properties. One of the materials may specifically include textured vegetable protein.

5 Claims, 8 Drawing Sheets

U.S. PATENT DOCUMENTS

| | | | |
|---|---|---|---|
| D374,520 S | 10/1996 | Plunk |
| 5,773,038 A | 6/1998 | Hettinga |
| 5,827,565 A | 10/1998 | Axelrod |
| 5,947,061 A | 9/1999 | Markham et al. |
| 6,093,427 A | 7/2000 | Axelrod |
| 6,116,191 A | 9/2000 | Suchowski et al. |
| 6,117,477 A | 9/2000 | Paluch |
| 6,126,978 A | 10/2000 | Axelrod et al. |
| 6,159,516 A | 12/2000 | Axelrod et al. |
| 6,200,616 B1 | 3/2001 | Axelrod et al. |
| 6,202,598 B1 | 3/2001 | Willinger |
| 6,254,910 B1 | 7/2001 | Paluch |
| 6,305,326 B1 | 10/2001 | Suchowski et al. |
| D450,894 S | 11/2001 | Suchowski et al. |
| 6,312,746 B2 | 11/2001 | Paluch |
| 6,360,695 B2 | 3/2002 | Suchowski et al. |
| 6,391,352 B1 * | 5/2002 | Hawkes et al. | 426/96 |
| 6,415,741 B2 | 7/2002 | Suchowski et al. |
| 6,468,458 B1 | 10/2002 | Anderson et al. |
| 6,474,268 B1 | 11/2002 | Suchowski et al. |
| 6,511,691 B1 | 1/2003 | Willoughby et al. |
| 6,672,252 B2 | 1/2004 | Levin et al. |
| 6,733,263 B2 | 5/2004 | Pope et al. |
| 6,827,957 B2 | 12/2004 | Paluch et al. |
| 6,896,924 B2 | 5/2005 | Hernandez et al. |
| 6,949,595 B2 | 9/2005 | Morgan et al. |
| 6,981,471 B1 | 1/2006 | Dubinins et al. |
| 2002/0172752 A1 | 11/2002 | Chizmas |
| 2002/0185084 A1 | 12/2002 | Sherrill et al. |
| 2002/0185085 A1 | 12/2002 | Sherrill et al. |
| 2003/0079693 A1 | 5/2003 | Jager |
| 2004/0005392 A1 | 1/2004 | Filipi et al. |
| 2004/0025803 A1 | 2/2004 | Sherrill et al. |
| 2004/0126462 A1 | 7/2004 | Tepper et al. |
| 2005/0166865 A1 | 8/2005 | Handelsmak et al. |
| 2005/0255184 A1 | 11/2005 | Maupin |
| 2006/0188611 A1 | 8/2006 | Unlu et al. |

OTHER PUBLICATIONS

Hartz Dental Chew 'N Clean Bones Dog Toy, www.hartz.com, Mar. 3, 2006 (1 page).

Hartz Dental Chew 'N Clean Deli Cuts Dog Toy. www.hartz.com, Mar. 3, 2006 (1 page).

Hartz Dental Chew 'N Clean Dental Duo Dog Toy/Edible Chew. www.hartz.com, Mar. 3, 2006 (2 pages).

* cited by examiner

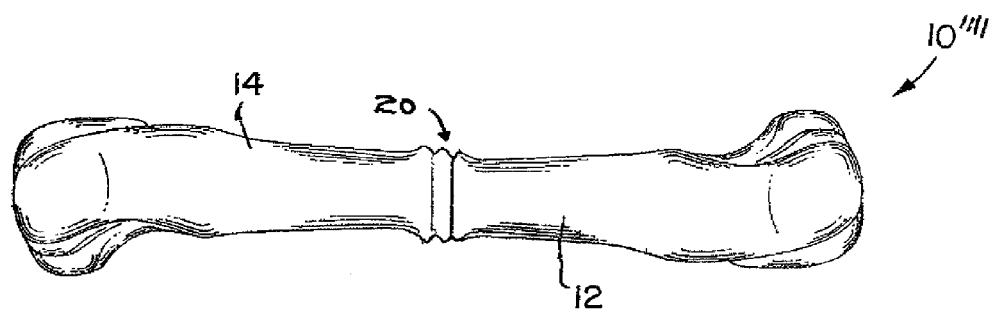
FIG. 14
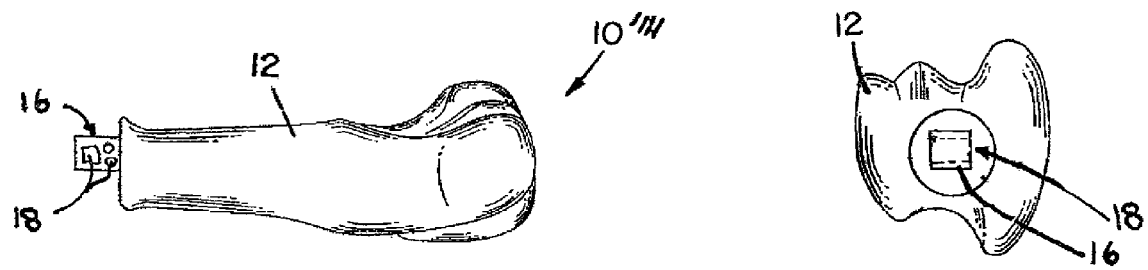
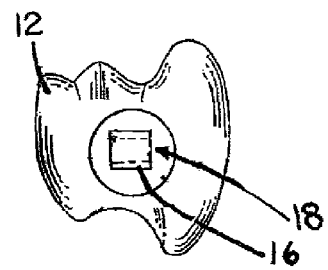
FIG. 14A
FIG. 14B

PROCESSES FOR FORMING MULTI-LAYERED PET TREATS

CROSS-REFERENCE TO RELATED APPLICATION

The present application is a Continuation-In-Part application of U.S. patent application Ser. No. 11/372,992 now U.S. Pat. No. 7,851,001 filed Mar. 10, 2006, which is incorporated herein by reference in its entirety.

FIELD OF THE INVENTION

The invention herein relates to pet treats or chews, and more particularly to a process for producing multi-component pet treats or chews from an unlimited number of edible components in a continuous process with comparatively high production output.

BACKGROUND OF THE INVENTION

Most dogs enjoy chewing on things although preferences vary as to the hardness of the substances favored. Some dogs like to chew on very hard materials such as cow bones, wood, nylon, or polyurethane, others prefer softer chews such as rawhide, while still others favor freeze dried snacks. Some dogs, due to their age, may not be able to chew on the hard substances. Young dogs have insufficiently developed teeth, while old dogs may have diseased gums or may have lost some of their teeth.

In appreciation of this problem, there has been previously developed an edible dog chew that is digestible and nutritious along with a texture or hardness which is individually adjustable by the application of heat to suit a wide variety of dog's preferences or needs. Such dog chews utilize a mixture containing primarily casein and are disclosed in U.S. Pat. Nos. 5,200,212 and 5,240,720, which are assigned to T.F.H. Publications, Inc. Other wholly digestible, edible dog chews have also been developed that are formed largely from various starch products.

In U.S. Pat. No. 5,827,565 owned by T.F.H. Publications Inc. and included herein by reference, there is disclosed a process for making a heat expandable dog chew comprised primarily of injection molding potato starch granules and an attractant. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced may be modified in texture or hardness by subsequent heating, preferably in a microwave oven.

In U.S. Pat. No. 6,126,978, which is a continuation-in-part of U.S. Pat. No. 5,827,565, and which is owned by T.F.H. Publications Inc. and included herein by reference, there is disclosed a dog chew having natural fruit flavor to increase the dog's appetite for such chew. The chew may be formed by extruding a mixture of potato starch, water and calcium carbonate to form granules adding a fruit flavor to the granules and injection molding such ingredients into the shape of a dog chew. Such a fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintains the basic ingredient of a heat-expandable starch, such as potato starch. Fruit flavoring may be added to the granules of a mixture of potato starch, water and calcium carbonate along with natural fruit flavorings.

In U.S. Pat. No. 6,200,616, which is a continuation-in-part of U.S. Pat. No. 6,126,978, owned by T.F.H. Publications Inc. and included herein by reference, there is disclosed a method of forming an animal chew by supplying substantially dehydrated fruit chips and a food coloring, forming a mixture of the two and injection molding or compression molding the mixture to form an animal chew. In a second embodiment, the fruit chips may be mixed into a polyurethane resin and formed into a shape.

In U.S. Pat. No. 6,159,516, which is owned by T.F.H. Publications, Inc. and included herein by reference, there is disclosed a process for forming starch into a molded article by combining starch and water to form a mixture, heating the mixture in a vented barrel extruder, forming beads having a given water content and injection molding the beads to form a molded article.

Attention is also directed to the following United States patents, owned by T.F.H. Publications Inc.: U.S. Pat. No. 5,476,069 entitled "Molded Rawhide Chew Toy"; U.S. Pat. No. 6,093,427 entitled "Vegetable Based Dog Chew"; U.S. Pat. No. 5,827,565 entitled "Edible Dog Chew"; U.S. Pat. No. 5,941,197 entitled "Carrot-Based Dog Chew"; U.S. Pat. No. 6,180,161 entitled "Heat Modifiable Edible Dog Chew"; U.S. Pat. No. 6,126,978 entitled "Improved Edible Dog Chew"; U.S. Pat. No. 6,110,521 entitled "Wheat & Casein Dow Chew With Modifiable Texture"; U.S. Pat. No. 6,093,441 entitled "Heat Modifiable Peanut Dog Chew"; U.S. Pat. No. 4,093,427 entitled "Vegetable Based Dog Chew"; and U.S. Pat. No. 4,093,427 entitled "Heat Modifiable Edible Dog Chew" No. 6,180,161. In addition to such patents, attention is also directed to the art cited in said patents, as such art may relate to the field of molded edible pet products.

U.S. patent application Ser. No. 11/372,992 filed Mar. 10, 2006, is directed at animal chews comprising more than one material wherein the materials may be different in, for instance, hardness, flexural modulus, tensile strength or clarity and is incorporated herein by reference in its entirety. The materials may be disposed in layered relationship. The chews may be formed by insert molding, multiple component molding, rotary molding, shuttle molding or any number of melt conversion processes.

Additionally, while the above prior art confirms numerous successful efforts to provide an edible chew, there remains, of course, a continuing need to develop other techniques of manufacture that will provide expanded and more efficient production capability, particularly for multi-component edible chews or treats.

SUMMARY

In a first non-limiting embodiment, the present invention is directed at a method of manufacturing a multi-component pet treat or chew comprising two or more materials which may differ in some physical, optical, nutritional, sensual or compositional property, wherein the multiplicity of materials may be formed to lie adjacent one another in layered, surrounding, partially surrounding, abutting or interlocked fashion. In one exemplary embodiment, the two or more materials may be injection molded by forming a first shape from the first material in a first mold cavity, followed by moving the first molded shape to a second mold cavity to form the second material adjacent and in contact with at least a portion of the first material. In a second exemplary embodiment, the two or more materials may be injection molded by forming a first shape from the first material in a first mold cavity, followed by removing a portion of the first mold cavity to form a second mold cavity adjacent the first mold cavity and forming the second material in the second mold cavity, adjacent and in contact with at least a portion of the first material. In both of these embodiments, the multi-component pet chew may be formed by a method of melt processing such as, but not limited to, injection molding, compression molding, insert molding, lost core molding, die-slide molding, gas assist injection molding, expandable/retractable core technology and transfer molding. In a third non-limiting exemplary embodiment, a rotary platen or turntable including a plurality of mold stations may be provided, each station including a pair of mold halves which may cooperate to form a mold cavity in the shape of the article to be molded. The rotary platen or turntable may be capable of rotating such that each mold station may access the injection nozzles of one or more injection molding machines. The platen or turntable may rotate such that a pair of mold halves may be matched to align with an injection molding machine nozzle such that the cavity space formed by the cooperating mold halves may be filled with a first, for instance edible, composition which may be dispensed by the injection molding machine. Subsequently, as the platen or turntable indexes from station to station, one of the mold halves and the first material layer just formed may move to the next mold station and be matched to a second (or third, etc.) mold half providing a larger cavity space than the previous mold set to allow a second material composition to be injected by a second injection molding machine in adjacent, for instance layered, disposition over the first layer. The rotary platen may operate in a vertical plane and carry a series of mold halves which may be aligned with a series of mold halves on a cooperating stationary platen.

Either or both of the adjacent layers may comprise, for instance, an edible moldable composition which may include, but not limited to, flavorants, colorants, nutrients, attractants, vitamins, minerals, herbs, breath-enhancers, synthetic polymers, starch, rice meal, soybean, casein, protein, rawhide, dairy and meat by-products, fruit and vegetable matter and animal matter. The first and second materials may further differ in some physical, optical, nutritional, sensual or compositional property to provide, for instance, an attractive treat or chew for an animal or pet. The first and second material may, e.g., differ in the functionality when consumed by an animal, such as one material providing nutritional supplements for improving skin and coat and one material providing nutritional supplements to address joint problems. In such fashion, the first and second materials may be processed under selected conditions that may prevent a particular nutritional supplement from degrading due to a given heat and shear profile experienced in molding.

In a fourth non-limiting embodiment, a rotary turntable may be horizontally disposed and have a plurality of injection units around at least a portion of its periphery, the turntable carrying a plurality of mold halves that may be indexed to align with a plurality of stationary mold halves to form cavities of different volumes. The movable mold halves and a previously formed layer may rotate in sequence to align with a stationary mold half and an injection molding machine to form layered edible products.

In a fifth non-limiting exemplary embodiment, a shuttle mechanism employing, for instance, translatory movement may be used in place of the rotary turntable or rotating platens to access multiple injection machines.

Yet a further aspect of the present invention relates to multi-component pet chews or treats wherein the multiplicity of materials may be formed to lie adjacent one another in layered, surrounding, partially surrounding, abutting or interlocked fashion and provide a treat providing additional interest to the pet because of property differences in the materials used to form such treat.

BRIEF DESCRIPTION OF THE DRAWINGS

The detailed description below may be better understood with reference to the accompanying figures which are provided for illustrative purposes and are not to be considered as limiting any aspect of the invention.

FIG. 14 is a side view of a multi-component pet treat according to the present invention, illustrating how two different compositions may be dielocked together as part of the molding process.

FIG. 14A is a side view of a first molded component prior to having a second component molded against it to form the treat of FIG. 14.

FIG. 14B is an end view of the first molded component of FIG. 14A, as viewed from the left side thereof.

DETAILED DESCRIPTION OF THE INVENTION

Figure 1:
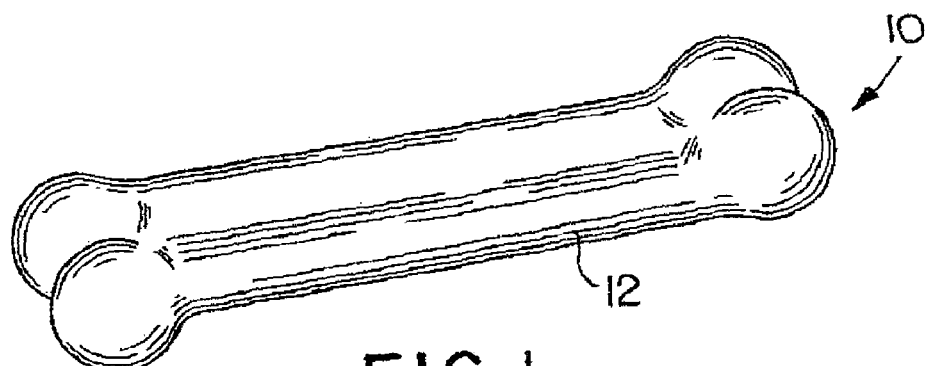
FIG. 1 illustrates a prior art edible dog chew or pet treat having a uniform composition.

In accordance with the present invention, a method of manufacturing a multi-component animal chew or pet treat is disclosed. Pet treats and animal chews are popular items in today's homes and are generally molded of edible compositions in high volume production processes using plastic-type melt processing methods and equipment. In the past, a single composition of uniform construction 10 (see FIG. 1) was molded to shape, however, to provide greater diversity for the pet and longer life of the treat, it has become desirable to offer multi-component treats. Such a treat or chew may comprise two or more materials which may differ in some physical, optical, nutritional, sensual, functional or compositional property, wherein the multiplicity of materials may be formed to lie adjacent one another in layered, surrounding, partially surrounding, abutting or interlocked fashion.

A difference in optical property may be understood herein as a difference in, e.g., color, shape or clarity. A difference in nutritional property may be understood as a difference in, e.g., vitamin or mineral content, calories, protein level, starch level, etc. A difference in sensual properties may be understood as a difference in attractant level. A difference in compositional properties may be understood as a difference in the chemical structure of one or more ingredients relied upon to formulate the treat. A difference in functional properties may be understood as a difference in the treat's ability to provide, e.g. a particular beneficial attribute when consumed by the animal. For example, improvement in one or more of the following: skin and coat health; reduction in joint problems; and/or weight control, etc.

Figure 2:
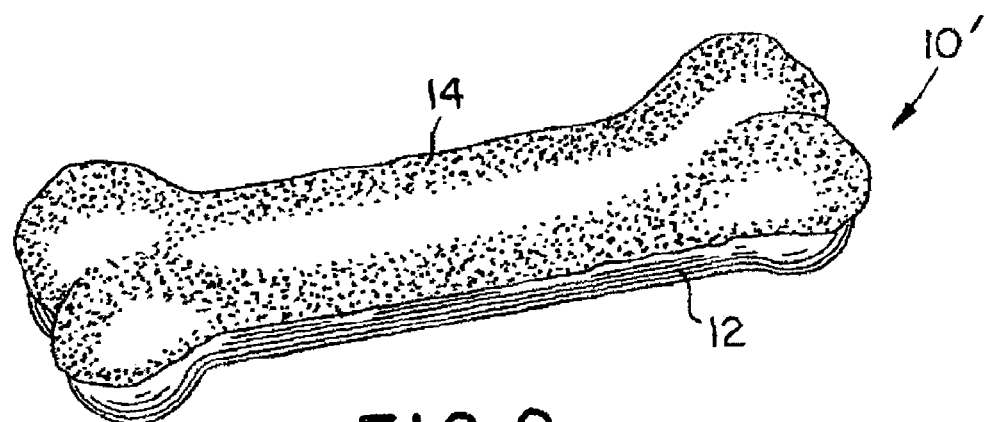
FIG. 2 illustrates a layered or two component pet treat according to the present invention.

FIG. 2 illustrates a two-layered pet treat 10' comprising a first edible composition 12 of a harder, perhaps bone-simulating composition at least partially covered by a second edible composition 14 of a softer, perhaps flavored composition. This encourages the pet to attempt to separate the layers and have a choice as to which composition it prefers, hard or soft. While illustrated in FIG. 2 as the two materials 12, 14 being in overlying, or layered, disposition, it is intended that FIG. 2 is exemplary and that the two materials may be formed adjacent and in contact with one another such that they may be disposed in above/below, side by side, end to end, sheath/core relationships, as well as combinations thereof.

Figure 3:
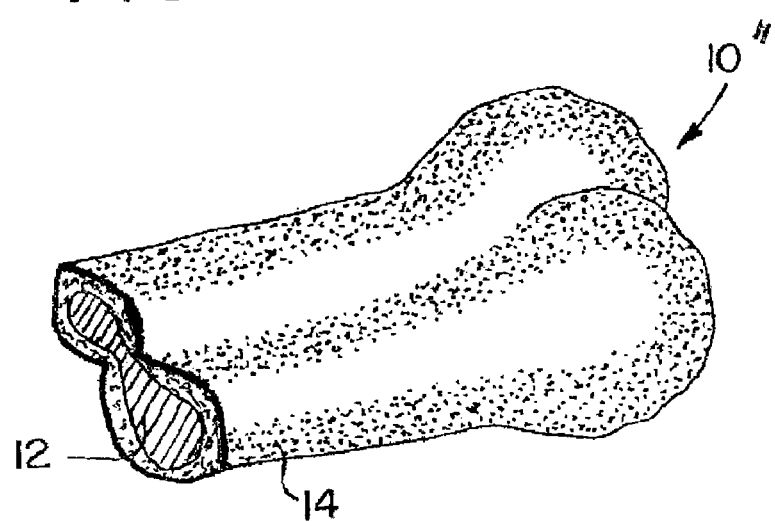
FIG. 3 illustrates a multi-layered pet treat where a core portion is substantially surrounded by an outer layer(s) according to the present invention.
Figure 4:
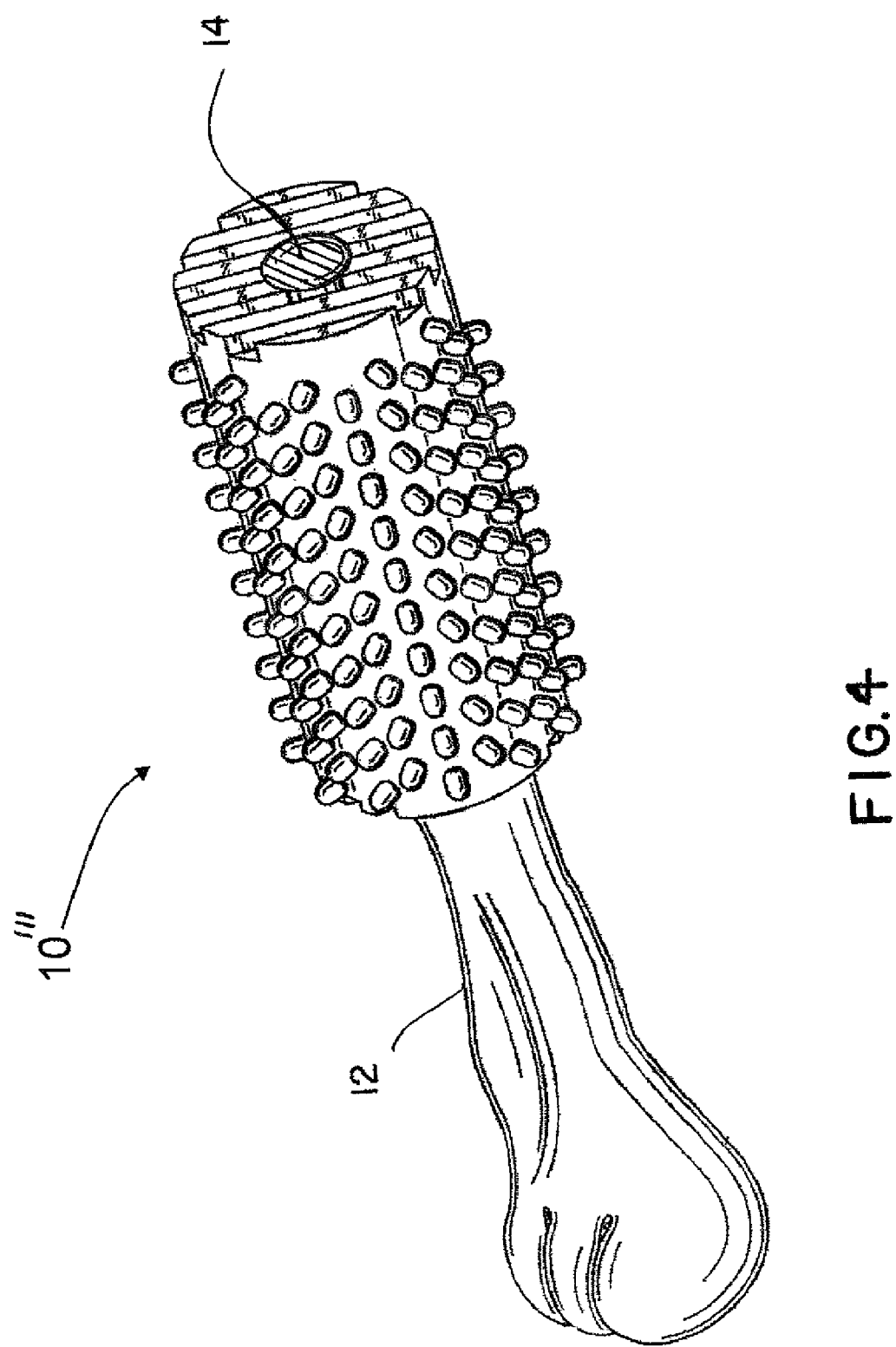
FIG. 4 illustrates an alternate pet treat shape where the core of FIG. 3 becomes the outer layer and the outer layer of FIG. 3 becomes a core layer according to the present invention.

In order to "hide" the treat layer it may be preferred to overlie the two different edible compositions in a core/sheath construction 10" as shown in FIG. 3. Here, the harder layer 12 is shown as the core. In another embodiment, FIG. 4 illustrates an alternate pet treat shape 10'" having a harder outer composition 12 and a softer core composition 14. In this illustration, the softer treat material 14 is left exposed at one end of the chew 10'" to attract and encourage the pet to engage with the chew. Thus, the multi-component pet treat of the present invention may comprise any combination of layers, partially or fully covering one or more additional layers or in surrounding, partially surrounding, abutting or interlocked fashion.

The method of manufacturing the pet treat of the present invention initially involves the formation of at least a first composition and a second composition. In general, these compositions involve the combination of an edible base component with a suitable binder, which can all be selected depending upon the needs of any given animal. For example, an edible base component may be sourced from products such as starch, rice meal, soybean, casein, denatured and partially hydrolyzed casein, protein, rawhide, dairy, meat by-products (e.g. chicken by-products), plant, vegetable matter or animal matter. Accordingly, any edible component may be utilized, without limitation, and, of course, ideally targeted to the particular needs of the animal.

In particular, the edible component herein may rely upon the use of textured vegetable protein (TVP) which may be understood as any vegetable protein product that has a fibrous structure. By fibrous structure it may be understood as a particulate material having a length dimension that exceeds a width or thickness measurement. TVP may be formed from defatted soy flour, which may be sourced as a by-product from the manufacture of soybean oil, and may contain 50% soy protein. It may therefore be hydrated before use. The fibrous structure of TVP may therefore approach the texture of meat. Texture may therefore be understood as a consideration of physical features of the food products, such as compressibility. It may also be appreciated that the textured vegetable protein may come from a variety of other sources, such as grains (e.g. wheat) cereals, nuts, seeds, legumes, yeast, beans and/or fruits, and mixtures thereof.

One example of a TVP suitable for use herein may be sourced from Archer Daniels Midland, Decatur, Ill., which reportedly contains crude protein (53%), moisture (9%), crude fat (3.0%), dietary fiber (18%) and about 32% carbohydrates. Such product may specifically include product sold under the designation TVP163 and/or TVP 165. Such product may also include vitamins and minerals and various amino acids. Therefore, in the context of the present disclosure, a TVP may be understood as a product that, as noted above, includes a fibrous structure, and which contains more than about 50% protein (which may be derived from a soy product) along with other miscellaneous ingredients.

In addition, given the use of the TVP noted above, it may now be appreciated that the treats or chews that may be produced herein may specifically be such that they are relatively wheat-gluten free. This may be understood as a level of wheat-gluten that is less than or equal to about 5.0% by weight. Wheat gluten is reference to the amorphous mix of proteins that is typically sourced from the flour of wheat and other grains by removal of the starch component. Wheat gluten is often identified as the component that may provide for the elasticity of kneaded dough and may typically be present in a variety of baked products. Further, treats or chews which contain fiber, are low in fat, are gluten free and are relatively high in protein content may be of particular value.

Accordingly, textured vegetable protein, such as TVP® 163 or 165 from Archer Daniels Midland, was combined with water and glycerine in the ratios shown in Table 1, below, and supplied to an injection molding machine to form molded dog chews.

TABLE 1

| (Weight Percent) | |
|---|---|
| TVP ® | 65.0 |
| Glycerine | 21.5 |
| Cellulose fiber | 8.0 |
| Lethicin | 2.0 |
| Water | 2.0 |
| Flavor Enhancer | 2.0 |
| Flavoring | 0.5 |
| | 100 |

Furthermore, while edible components may be preferred for these compositions, it is also contemplated that synthetic polymers may be employed. These may include thermoplastic polymers, such as polyamides, polyurethanes as well as ethylene copolymers, such as poly(ethylene acrylic acid) and poly(ethylene vinyl alcohol). In the case of such resins, the process herein can also be applied and the conditions selected to avoid significant degradation of such resins in the sense that the mechanical properties of the resins (tensile strength, modulus) in their final configured shape, is substantially maintained.

Accordingly, the compositions may include vitamins, minerals, and/or herbs of any desired variety, and at any desired concentration, and as may be appropriate for the animal for which the animal chew is targeted. For example, in the case of dogs, the vitamins may comprise A, C, $B_{12}$, D, E, thiamine, riboflavin, panthothenic acid, niacin, pyridoxine, folic acid and choline. In the case of cats, the vitamins may comprise vitamins A, C, $B_{12}$ D, E, and K, thiamine, riboflavin, pyridoxine, niacin, panthothenic acid, folic acid, biotin and choline.

Preferred minerals are calcium, phosphorus, potassium, sodium, chloride, magnesium, iron, copper, manganese, zinc, iodine and selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium may only be required in mg or mu·g/day. The pet treat herein can therefore be modified to reflect a higher or lower concentration of a given mineral, according to nutritional requirements.

Turning next to the herbal component, the herbs herein are preferably selected from the group consisting of St. Johns Wort, Kava Kava, Ginkgo Biloba, Ginseng (Asian or Siberian varieties), Echinacea and mixtures thereof. Other herbs may include Catsclaw, Camomile, Golden Seal, Saw Palmetto, Valerina, V. Agnus-Castus, Black Cohosh, Bilberry and Milk Thistle. Herbs may also include aloe, astragalus, burdock, chamomile, chestnut, coriolus, versicolor, couchgrass, crampbark, dandelion root, dong quai, elecampane, evening primrose, eyebright, false unicorn root, feverfew, garlic ginger, goldenseal, gota kola, grape seed extract, green tea, guggulipid, hawthorn, hops, ivy, licorice, milk thistle, mistletoes (American Asian and European varieties), motherwort, oats, osha, passion flower, pumpkin pygeum, red clover, rosemary, sarsaparilla, skullcap, saw palmetto, stinging nettle, wild indigo, wild yam and yerba mansa. In addition, glucosamines and/or chondroitin can be added to any of the embodiments described herein.

The binder component may include any material which serves to bind together the edible component noted above. The binder may therefore include, but not be limited to, a binder which upon heating and cooling serves to bind the edible component together so that it can be readily processed and formed into, e.g., a pet treat or animal chew. Alternatively, the binder may be one that binds the edible components together without the use of heat. Such binders may include one or more proteins soluble or dispersible in a neutral or alkaline aqueous solution and a powdery product selected from the group consisting of, e.g., a hydroxide of an alkaline earth metal.

One suitable binder composition which serves to bind upon application of heat and cooling includes a combination of water, gelatin, corn syrup and glycerin. It can therefore be appreciated that the binder composition itself may be consumed by the animal consistent with the edible characteristics of the pet treat or animal chew that is formed herein. Other suitable binder compositions may include sucrose and/or mixtures of glucose and its polymers. Binders may also include solutions or slurries based upon various gums (e.g., guar, pectin, carrageenan, xanthan, gellan, carboxy methylcellulose), proteins (e.g., gelatin, soy proteins, egg whites, hydrolyzed soy proteins), starches (e.g., pregelatinized, modified starches) and nutritive carbohydrate agents (sucrose, dextrose, corn syrup, honey, fruit juices). The binder therefore may be applied dissolved or dispersed in liquid form. Moisture, which may therefore be added or present in the base component/binder mix, is then selectively removed, as more fully described below.

Furthermore, certain binders may additionally comprise a fat (oil and/or solid) component. The fat component might comprise, e.g., about 0.1% to about 50% of the final chew product. Useful herein are fats and oils that are conventional for use in food products. The fat component may include lecithin and other emulsifiers, e.g., acetylated mono-glycerides, if desired.

The base material may be therefore preferably combined with the binder and combined, as noted, to form a slurry type preparation. The base material, as noted, may include any edible composition suitable for preparing a pet treat. It should also be noted that formation of the dry mix slurry preparation may be accomplished by first mixing together any solid components to obtain a dry mix and then mixing the dry mix with liquid or fluid components. Alternatively, the solid components may be combined with the liquid components in one complete mixing step.

The mixture of base material and binder may be then introduced into the barrel of an injection molding machine which may be heated. The rotary screw, which may serve as an auger type conveyor, therefore serves to further mix the binder and base components and when heated, as applied to a mixture containing liquid, may operate to increase the composition to an overall higher solids level, or stated another way, to a lower moisture level, in connection with those mixtures that contain moisture. It should be noted that the preferred screw/auger type conveyor may develop pressure within the barrel and feed a mold to produce a shaped article.

A process consistent with the present disclosure may therefore be used for manufacturing edible pet treats and/or edible animal chews. Pet treats consistent with the present invention are intended to be fully consumed by a pet or animal. As such, when the desired product is a pet treat or animal chew it may also be formed from ingredients providing nutritional benefit. Similarly, animal chews consistent with the present invention may be intended to provide nutritional value along with oral health benefits, serving to massage the gums of the pets during the chewing action, etc. Furthermore, as noted earlier, the product herein may alternatively be formed from edible or even non-edible ingredients, wherein the non-edible ingredient may be selected, among other reasons, to provide extended durability when chewed by an animal.

Furthermore, it should also be understood by those having skill in the art, however, that any classification of "treat" or "chew" as used herein has no bearing on the scope of the invention herein. In addition, it must also be noted that the concept of animal treat or chew herein is not limited and may extend to birds, small mammals, etc.

More specifically, in the case of birds and small mammals, the composition may comprise rolled oats, peanuts and/or other nuts, hulled sunflower seed, corn sugar, corn syrup, walnuts, almonds, pecans, banana, mango, papaya, raisins, dehydrated apples, cranberries, pepitas, ground corn, gelatin, glycerin, pistachios, corn gluten meal, dehulled soybean meal, pinenuts, ground wheat, wheat middlings, ground oat groats, calcium carbonate, dicalcium phosphate, soy oil, dried whole egg, dried beet pulp, salt, wheat germ meal, L-lysine, brewers dried yeast, dehydrated alfalfa meal, vitamin A supplement, choline chloride, DL-methionine, propionic acid (a preservative), yucca schidigera extract, dried cane molasses, vitamin E supplement, vitamin B12 supplement, ferrous carbonate, zinc oxide, riboflavin supplement, ethoxyquin (a preservative), manganous oxide, menadione sodium bisulfite complex, (source of vitamin K activity), niacin, calcium pantothenate, copper oxide, cholecalciferol (source of vitamin D3), pyridoxine hydrochloride, thiamine mononitrate, beta-carotene, cobalt carbonate, calcium iodate, folic acid, biotin, dried bacillus subtilis fermentation product, dried bacillus coagulans fermentation product, dried bacillus licheniformis fermentation product, and sodium selenite.

In accordance with the certain aspects of the present invention, it is therefore noted that the method herein provides a base material and/or binder composition that has an initial selected moisture level of preferably at or below 50% (wt). Accordingly, any range of moisture at or below 50% (wt) is contemplated, without limitation. Then, in the process of the manufacture of the treat or chew, the moisture level is preferably reduced to a level of at or below 15% (wt), including any range of moisture at or below such level. Therefore, for example purposes only, it is preferable that the initial moisture level of the base (e.g. edible) material may be about 40-45% (wt), and the moisture level of the treat or chew ultimately produced is at or below 15% (wt). Alternatively, the initial moisture level may be about 20-25% (wt), and the final moisture level may be about 10-12% (wt).

Furthermore, in the course of the processing outlined herein, it is noted that it is preferred to maintain the temperature control of, e.g., the injection molding machine for softer compositions, to a temperature of at or below 200° F. (95° C.). As applied to edible components, as well as the optional vitamin, mineral or herb additives, such temperatures avoid the more significant degradation in nutritional value that may occur at higher temperatures and at higher shear rates which may be found in conventional injection molding and extrusion type equipment.

Consistent with the present disclosure, various other additives and processing aids may be advantageously combined with the base material. For example, and for the purpose of preparing a pet chew toy, it has been found preferable to add an attractant to the chew. The attractant may include a flavorant and/or an olfactory attractant. The attractant may be added in an amount of from about 1.0-5.0 wt. %, and all 0.1 wt. % increments therebetween. Such attractant may often be extracts from meat products such as chicken, liver, ham, turkey, beef and/or fish. Such attractants may be provided as a powder, an aqueous liquid, or an oil-based liquid.

The use of oil-based liquid flavoring or attractant additives and/or aqueous-based flavoring or attractant additive, has previously been limited because moldable starch or protein based materials often have a very poor affinity for oil-based liquid flavoring additives and/or aqueous based flavoring additives. It has been recognized that either the oil-based flavoring or aqueous based flavoring may be selectively absorbed into vegetable or plant based fibers, such as oat fiber, corn fiber, wheat bran, cellulose. The fiber may then be distributed within the starch, protein, plant matter, or rawhide base material, such that the base material is effectively flavored and such flavoring remains within the base material in amounts sufficient to attract an animal's interest.

By providing fiber in combination with the starch, protein, plant matter, or rawhide base material, both aqueous and oil-based additives may be effectively utilized and uniformly distributed in the product. Optimum additive uptake may be achieved by employing fiber in an amount of from about 1.0-10.0 wt. %, and at all 0.1 wt. % increments therebetween.

In addition to assisting in the uptake and retention of oil-based and aqueous additives, fiber may be used to help maintain a final desired moisture level in the product. The hardness of the final product may be, in part, influenced by the moisture content of the product. Over time, the animal chew may tend to dry out and become harder and/or more brittle. Fiber incorporated in the chew can act as a humectant, and therefore stabilize the moisture content of the chew over time and prevent drying. Fiber may, therefore, facilitate maintaining the intended hardness of the animal chew over time.

As the present invention is primarily directed at multi-component pet treats or animal chews, it should be understood that the multiple components formed in an adjacent, for instance at least a partially layered, configuration may comprise different compositions. While differing in chemical composition as described above, the different compositions may also differ in properties. These properties may include, but are not limited to, hardness, flexural modulus, tensile strength, rigidity, elasticity, toughness, texture, color, clarity, appearance, flavor, odor, digestibility and nutritional value.

The processing methods to form multi-layer or multi-component pet treats may become much more involved than for treats of a single composition as they may add tooling costs as well as labor and cycle time in order to efficiently produce high volumes of such products. Often, manual labor is required, along with excessive open press time and material handling to transfer a first molded component to a second or third mold to provide the layered article. In a first exemplary embodiment, the two or more materials may be injection molded by forming a first shape from the first material in a first mold cavity, followed by moving the first molded shape to a second mold cavity to form the second material adjacent and in contact with at least a portion of the first material.

In a second exemplary embodiment, the two or more materials may be injection molded by forming a first shape from the first material in a first mold cavity, followed by moving a portion of the first mold cavity to form a second mold cavity adjacent the first mold cavity and forming the second material in the second mold cavity, adjacent and in contact with at least a portion of the first material. For instance, a mold cavity may be provided with one or more mold segments that extend into the mold cavity to form a portion of the mold cavity surface. The mold segment may also retract providing a cavity for the second portion to be formed. Mold segments may be understood as a protrusion, or set of matching protrusions, which may form surfaces of a molded article, such as inner or exterior surfaces and may be positioned within the cavity parallel to, perpendicular to or at various angles to the direction of injection of the polymer material. The extension and retraction of the mold segments may be facilitated by the use of hydraulically, pneumatically or electrically activated plates, cams, actuators, etc. In addition, the mold segments may be retracted once the first composition has at least partially solidified to form a second cavity space adjacent the first component which may provide a space for forming the second component and surfaces upon which a second composition may adhere or be formed.

In both of these embodiments, the multi-component pet chew may be formed by a method of melt processing such as, but not limited to, injection molding, compression molding, insert molding, lost core molding, die-slide molding, gas assist injection molding, expandable/retractable core technology and transfer molding.

An indexing apparatus such as the rotary platen or turntable of the present invention may allow for higher speed, higher volume production with minimal labor and press open time then the embodiments described above.

Figure 5:
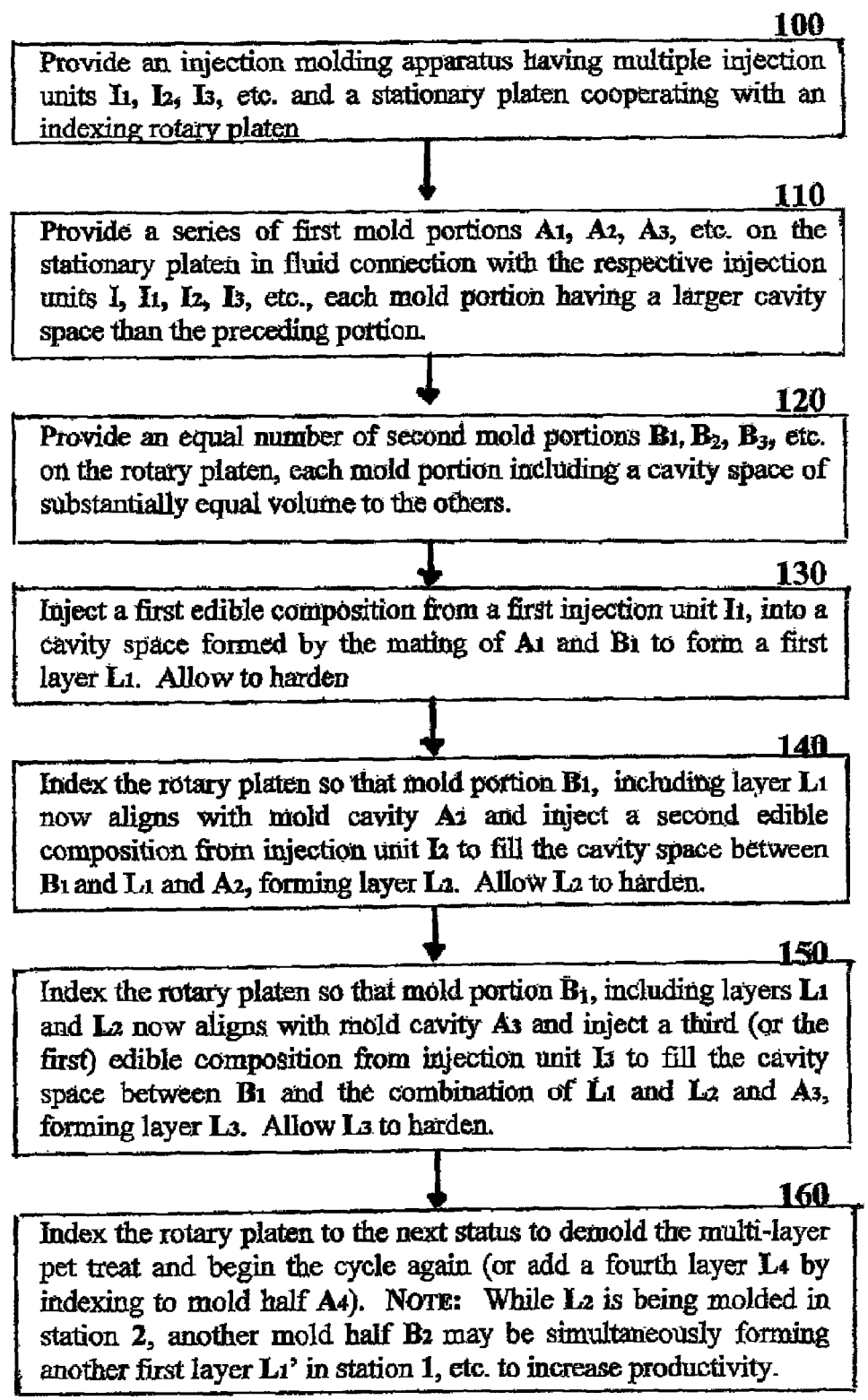
FIG. 5 illustrates in flow chart form the major processing steps for forming the multi-component pet treats of the present invention.

A third exemplary embodiment of a method of forming multi-component articles such as pet treats from multiple compositions is described in the flow chart of FIG. 5. Block 100 includes the step of providing an injection molding apparatus having multiple injection units $I_1$, $I_2$, $I_3$, etc. and a stationary platen cooperating with an indexing rotary platen. This may be followed as described in Block 110 by the step of providing a series of first mold portions $A_1$, $A_2$, $A_3$, etc. on the stationary platen in fluid connection with the respective injection units $I_1$, $I_2$, $I_3$, etc., each mold portion having a larger cavity space than the preceding portion. As shown in Block 120, this may be followed by providing an equal number of second mold portions $B_1$, $B_2$, $B_3$, etc. on the rotary platen, each mold portion including a cavity space of substantially equal volume to the others. This may be followed by Block 130 including the step of injecting a first edible composition from a first injection unit $I_1$, into a cavity space formed by the mating of $A_1$ and $B_1$ to form a first layer $L_1$. The layer is then allowed to harden (i.e. solidify to a point where it is suitable for the next step of over-molding). This may be followed by Block 140 including the step of indexing the rotary platen so that mold portion $B_1$, including layer $L_1$ now aligns with mold cavity $A_2$ and injecting a second edible composition from injection unit $I_2$ to fill the cavity space between $B_1$ and $L_1$ and $A_2$, forming layer $L_2$. Layer $L_2$ is allowed to harden. This may be followed by Block 150 including the steps of indexing the rotary platen so that mold portion $B_1$, including layers $L_1$ and $L_2$ now align with mold cavity $A_3$ and injecting a third (or the first) edible composition from injection unit $I_3$ to fill the cavity space between $B_1$ and the combination of $L_1$ and $L_2$ and $A_3$, forming layer $L_3$. Layer $L_3$ is allowed to harden. This may be followed by Block 160 including the steps of indexing the rotary platen to the next station to demold the multi-layer pet treat and begin the cycle again (or adding a fourth layer $L_4$ by indexing to mold half $A_4$). NOTE: While $L_2$ is being molded in station 2, another mold half $B_2$ may be simultaneously forming another first layer $L_1'$ in station 1, etc. to increase productivity.

Figure 6:
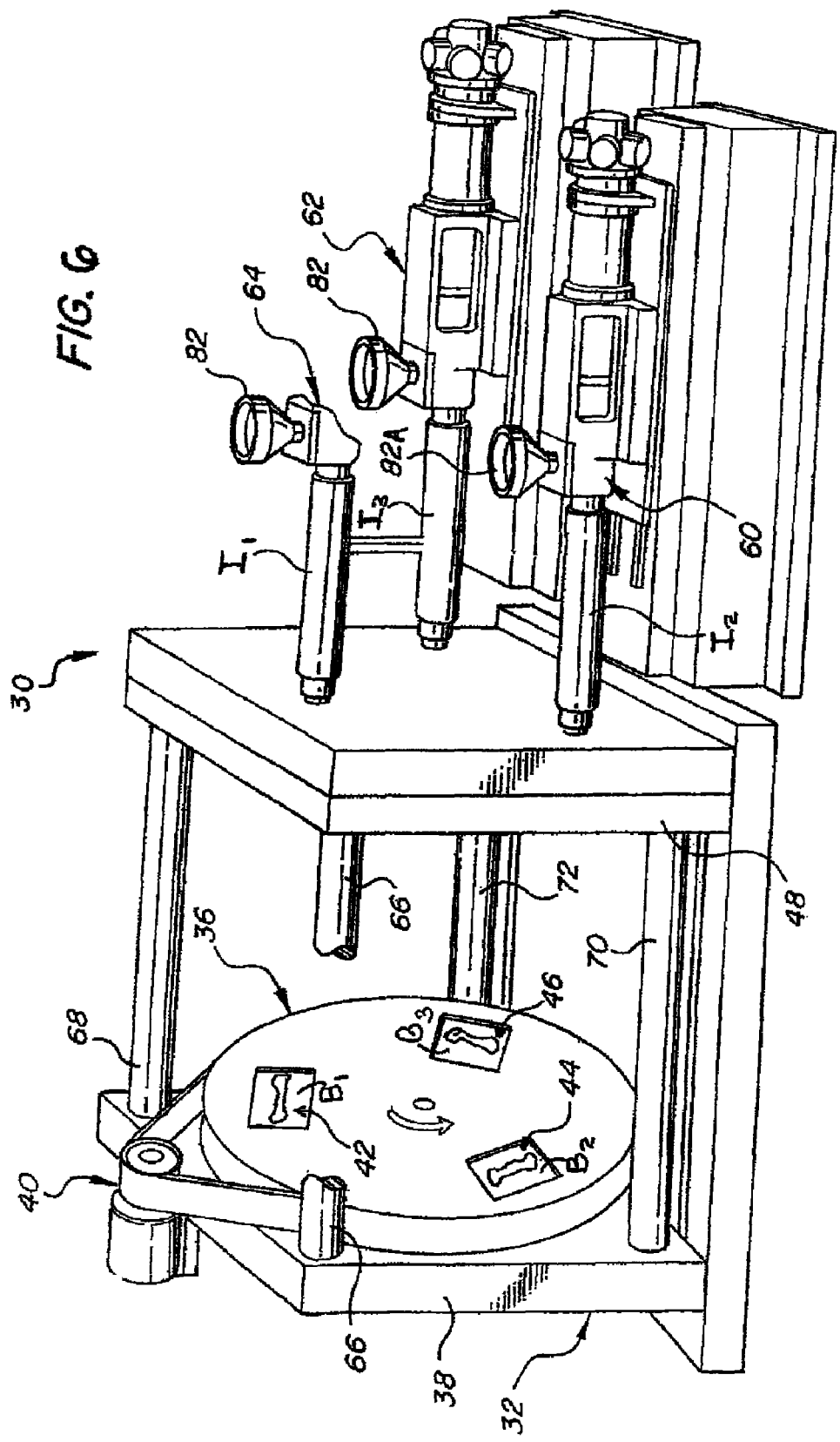
FIG. 6 is a perspective view of one type of apparatus for producing multi-component pet chews according to the present invention.

As noted in Block 160, the platen may be indexed to a fourth station to demold the multi-layered pet treat. Alternatively, the process may include three stations and demolding of the pet treat may take place by automatic ejection as the mold halves separate in station 3. FIG. 6 illustrates an apparatus of this type, and will be described in further detail below.

While the process is described above as one basic exemplary embodiment, it should be understood that additional features may be included to enhance the product or the efficiency of the process. For instance, a pet treat having more than three layers may be molded by including additional mold stations, and cooperating mold halves on the platen. Likewise, more than two compositions may be included by adding additional injection units. Further, to optimize productivity, it is anticipated that as a third layer is being molded in a third station, simultaneously a second layer may be molded in the second station and a first layer in the first station, so that at each indexing of the platen a pet treat is demolded and production efficiency is optimized.

Turning now to FIG. 6, a horizontal molding apparatus with vertical platens is shown. The apparatus 30 includes a mold press 32 which has a moveable platen 38 and a stationary platen 48. The press portion 32 may be opened and closed by a drive system (not shown) such as hydraulic, electric, toggle, etc. The moveable platen 38 may move from the extended position shown in FIG. 6 along tie bars 66, 68, 70 and 72 to engage the stationary platen 48 and allow mold halves to close to define cavity spaces for materials to be injected therein from injection units, $I_1$, $I_2$, and $I_3$. A rotary platen 36 capable of indexing in the direction of the arrow shown on its surface is carried on moveable platen 38. The rotary platen 36 may be driven about a horizontal axis by a motor drive system 40 or other means known to those skilled in the art.

In this third exemplary embodiment, the rotary platen 36 includes three mold stations 42, 44 and 46 which each carry a mold portion $B_1$, $B_2$ and $B_3$ respectively. Each mold portion includes a cavity space which when aligned with stationary mold portion $A_1$, or $A_2$ or $A_3$ (see FIG. 7) cooperate to define a cavity to be filled by one or more of the layers 12, 14 of the multi-component pet treats 10', 10", 10''' of the present invention (see FIGS. 8-10).

The mold press 32 is fed by a plurality of injection molding units $I_1$, $I_2$, $I_3$ to direct the aforementioned compositions through sprue gates 54, 56, 58 (see FIGS. 8-10) into cavity spaces formed by the combination of mold portion $B_1$ with mold halves $A_1$, $A_2$ and $A_3$, respectively. The compositions are supplied to injector feed system 60, 62, 64 (See FIG. 6) from feed hoppers 82, 82A through extrusion barrels, heaters and manifolds to gates 54, 56 58. As shown, injector units $I_1$ and $I_3$ are fluidly connected together and process the same composition to form layer 14 of pet treat 10" into a core/sheath configuration (see FIGS. 8 and 10).

Figure 7:
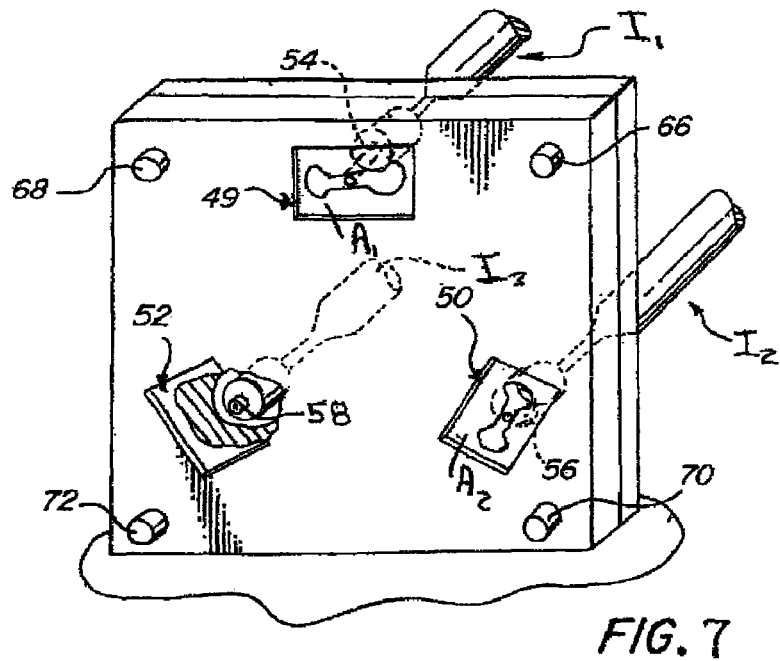
FIG. 7 is a perspective view of the face of the stationary platen of FIG. 6.

Turning to FIG. 7, a perspective view of the stationary platen 48 is shown including mold portions $A_1$, $A_2$ and $A_3$ (not shown) in stations 49, 50 and 52 respectively. The rotary platen indexes, first to align mold station 42 mold station 49 (on the stationary platen) so that mold portions $A_1$ and $B_1$ cooperate to form a cavity space into which a first composition may be injected from injection unit $I_1$ to form layer 14 (see FIG. 8). After hardening of layer 14, the rotary platen 36 is moved along tie bars 66, 68, 70 and 72 from engagement with stationary platen 48 and is indexed by drive system 40 so that mold portion $B_1$ (mold station 42) including layer 14 aligns with mold portion $A_2$ (mold station 50). This provides a cavity space between layer 14 and mold portion $A_2$ (see FIG. 9) so that a second composition may be supplied by injection unit $I_2$ to form layer 12. Upon hardening of layer 12, the moveable platen 38 is again retracted and the rotary platen 36 is indexed so that mold portion $B_1$ including layers 14 and 12 (mold station 42) now aligns with mold portion $A_3$ (mold station 52). This provides a cavity space so that injection unit $I_3$ may inject the first composition (or a third composition) to form layer 14'.

Figure 8:
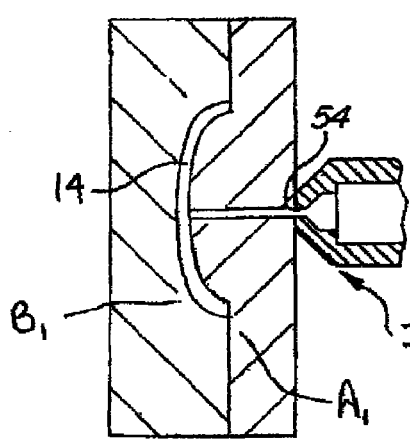
FIGS. 8-10 are cross-sectional views of successive mold combinations to produce a multi-component pet treat according to the present invention.
Figure 9:
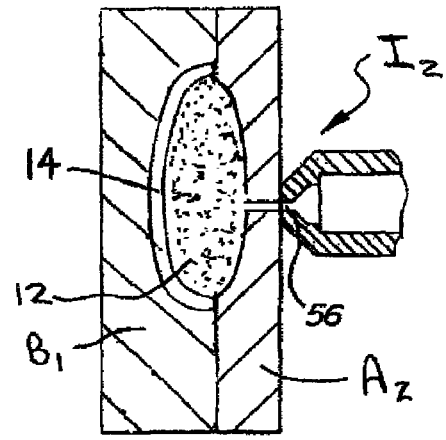
Figure 10:
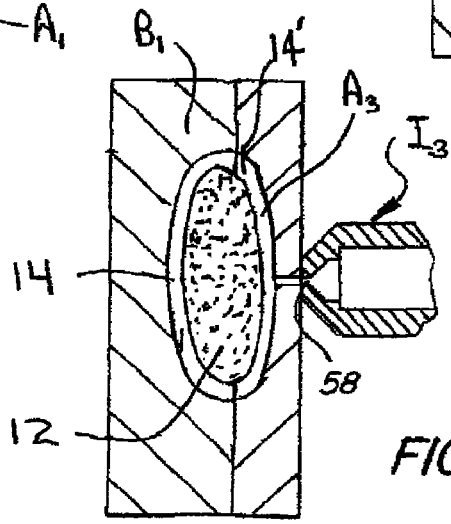

The process may then be repeated to form multi-component pet treats from multiple edible compositions. Standard ejectors may be used to allow each layer or component portion to be retained in the mold portion that travels on the moveable platen. Diagrammatically then, FIGS. 8-10 show the sequence of the mold portions engaging to form a cavity space which is filled with an edible composition to form a multi-component pet treat such as illustrated in FIG. 3. The mold portions may cooperate to form a pet treat of nearly any shape having multiple layers or adjacent portions of different edible compositions in at least partially layered relationship.

Figure 11:
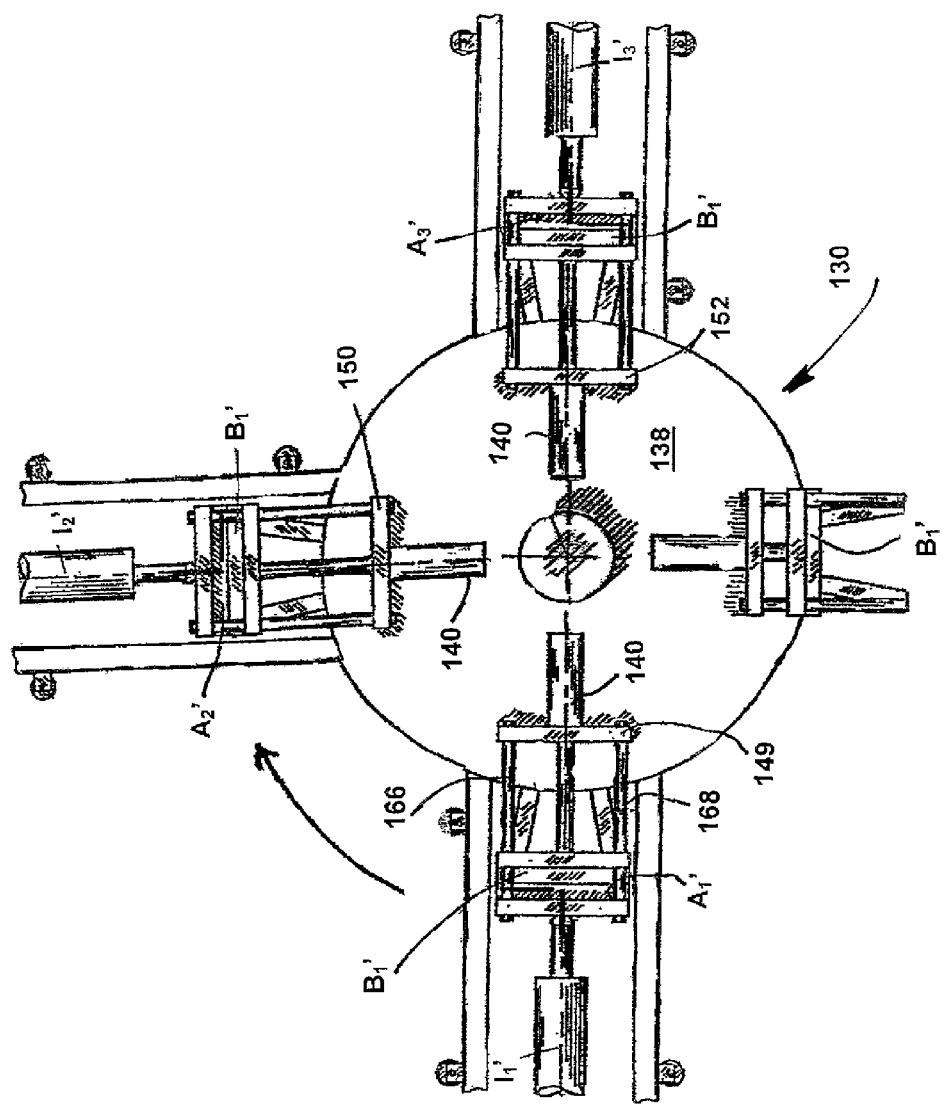
FIG. 11 is a plan view of an alternative indexing apparatus for producing multi-component pet chews according to the present invention.

In a fourth exemplary embodiment, the apparatus 130 may include multiple injection units $I_1'$, $I_2'$ and $I_3'$ and a rotary turntable or carousel 138 as shown in plan view in FIG. 11. Here, the injection units $I_1$, $I_2$, $I_3$ are preferably disposed essentially equally around the periphery of the horizontal turntable 138 and feed stationary mold portions $A_1'$, $A_2'$, and $A_3'$, respectively. Inside of these mold portions a plurality of moveable mold portions $B_1'$ are connected to mold frames 149, 150 152 which support the moveable mold portions on an indexing turntable 138. As the moveable mold portions and mold frames are indexed (in the direction shown by the arrow) to sequentially align with the stationary mold portions, the tie bars 166, 168, 170 (not shown) and 172 (not shown) of the mold frames 149, 150, 152 engage mating surfaces in the stationary $A_1'$, $A_2'$, $A_3'$ molds to provide registration. The moveable mold portions are then moved outwardly to mate with the respective station mold portion by the action of ram 140. As with the rotary platen of FIG. 6, when each layer has hardened and the mold frames retract, the turntable may index to align the next set of molds and form the next layer. Note that the mold frame and moveable mold portion $B_1'$ in the fourth mold station does not engage a stationary mold portion and injection unit. The final product may be demolded there.

Figure 12:
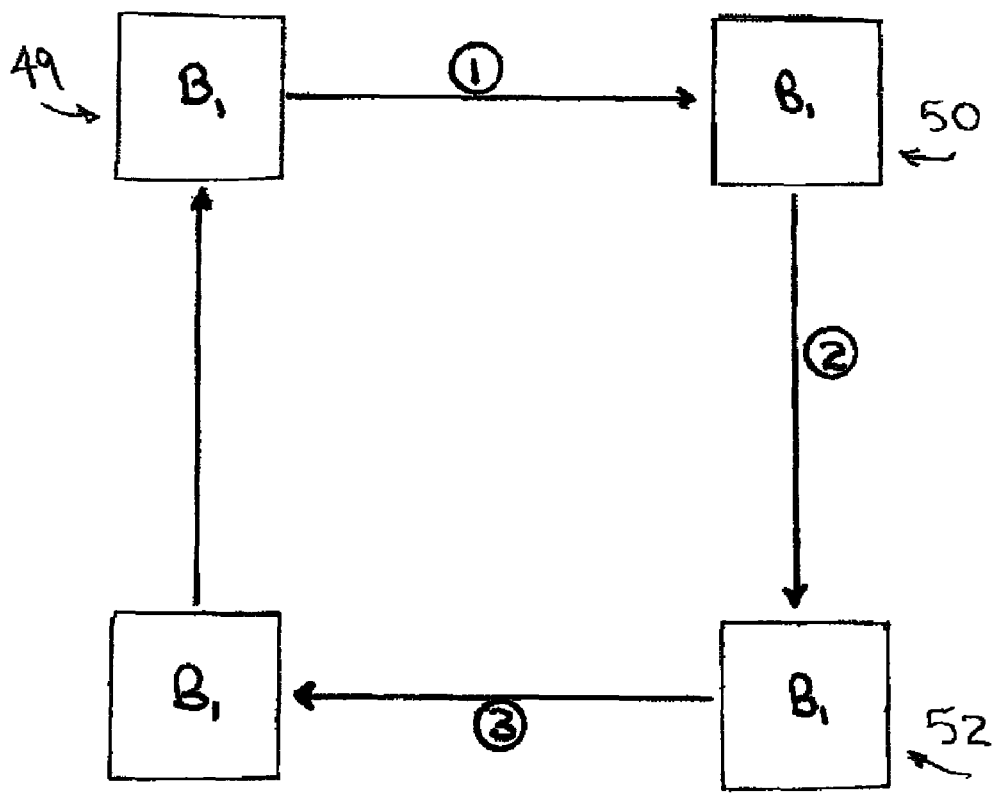
FIGS. 12 and 13 are schematic views of other indexing methods according to the present invention.
Figure 13:
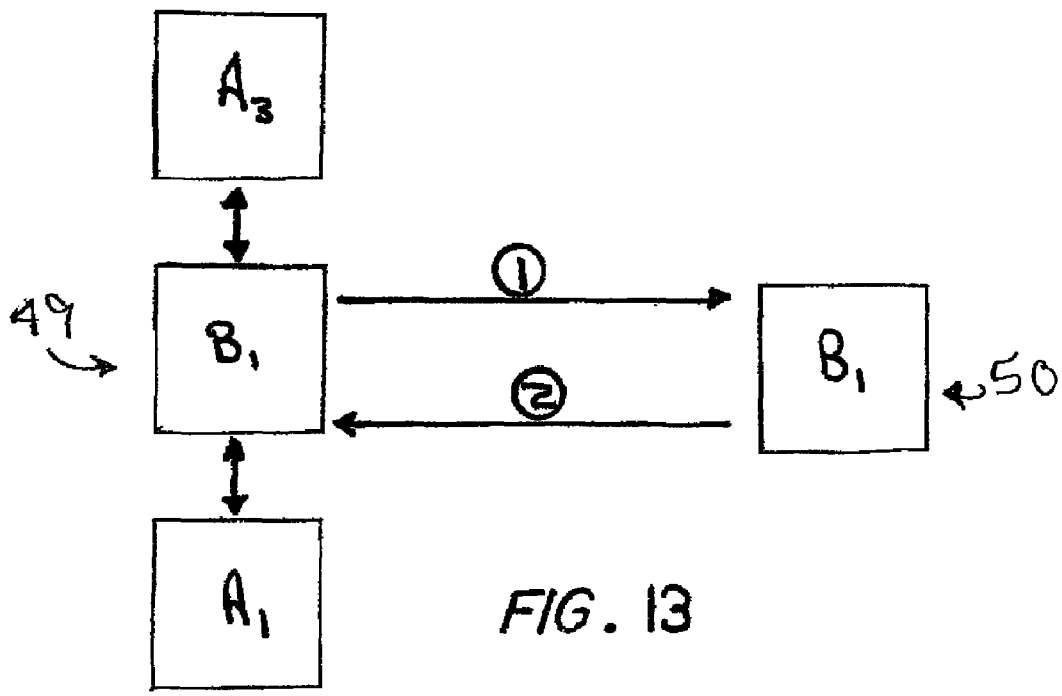

While the invention has been described using an indexing apparatus that operates in a rotary fashion, it is also contemplated in a fifth exemplary embodiment that the delivery of moveable mold portions in sequence to mold stations could be carried out by linear shuttle devices (translatory motion) as shown in FIGS. 12 and 13 where the numerals 1, 2 and 3 indicate the sequential movement of a moveable mold portion $B_1$ between mold stations 49, 50 and 52 to align with stationary mold portions $A_1$, $A_2$ or $A_3$. In FIG. 13 a double shuttle arrangement may exchange mold portion $A_1$ for $A_3$ in mold station 49 so that a first layer followed by a third layer 14' may be formed therein.

FIG. 14 is a side view of a two component pet treat 10'''' illustrating the attachment of two different components 12, 14 together by an insert molding process. The two components may differ in composition by any of the aforementioned properties. Here, two components differing in color or flexibility or nutritional value, for instance, may be attached to one another using the exemplary embodiments as described above, to form a pet treat having more attractiveness for the pet. A first component 12 of a first composition may be molded and placed in a second mold cavity wherein a second composition is injected to interface at 20 with the first component 12 and form a second component 14. In order to optimize the bonding of the core with the body, the compositions may also be selected so that during injection molding, the surface of the first component may melt a sufficient amount in the presence of the molten second composition so that the materials tend to melt bond. To achieve such a result the actual melting (Tm) or softening temperature of the first composition may be controlled to be within about +/−20° C. of the melting (Tm) or flow temperature of the second composition, or vice versa. Reference to a softening temperature may be understood as applicable in that situation where the resin may not necessarily indicate a defined crystalline melting point, but nonetheless has a softening temperature that allows for the material to be injected molded.

It should therefore be noted herein that the ability to sequentially mold edible materials, and/or an edible material in conjunction with a non-edible was found to uniquely depend upon the ability to select edible and/or non-edible materials that would in fact comply with the above preferred situation where one may select and control the melting or softening temperatures, without degrading the material, particularly in the case of an edible material containing selected nutritional components (e.g. vitamins, minerals and/or herbs). In addition, with edible resin materials, the control of temperature herein is such that it may now provide that the first material molded may be molded with a surface temperature ($ST_1$) that facilitates (i.e. avoids premature cooling) of the second edible composition that is overmolded, so that an appropriate layering and bonding may be achieved. For example, the surface temperature of the first material ($ST_1$) may be such that its temperature is below the temperature of the second edible material ($T_2$) when the materials come into contact. For example, $ST_1$ may be selected so that it is not more than about 5-50° C. lower than $T_2$, including all values and increments therein. For example, the surface temperature of the first edible material may be configured such that it is about, e.g., 5, 10, 15, 20, or 25° C., etc., below the temperature of the second edible material as the second material is introduced into the mold. It may be appreciated that if the surface temperature of the first edible material is at or within about 5° C. of the melting or softening temperature of the second edible material (e.g., $ST_1 = T_2$) there may be a tendency for the materials not to remain layered during molding. This may particularly be the case in injection molding where relatively high injection pressures may be utilized.

On the other hand, if $ST_1$ is at a relatively low temperature (e.g., more than about 50 degrees below $T_2$) then the second material may disadvantageously "freeze" relatively rapidly when encountering the surface of the first material making it relatively more difficult to complete the desired layering such that the two material have some level of melt bonding at the layer interface. Accordingly, the disclosure herein recognizes that in the case of the various disclosed edible resin, it is useful to maintain the surface temperature of the first formed resin at a temperature that is about 5-50° C. below the melting or softening temperature of the second resin that is selected for overmolding and formation of a layered product with bonding between the layers.

Furthermore, with respect to a compatibility requirement between the two materials that are sequentially molded herein, the first composition may therefore be selected so that it may have a solubility parameter ($\delta_1$) that is within +/−5 units $(cal/cm^3)^{1/2}$ of the solubility parameter value ($\delta_2$) of the second composition, including all values and increments therein, such as with in +/−1-2 units, +/−0.25-1 units, etc. Within such limits it is contemplated that the compatibility and phase separation that might otherwise occur between the two sequentially molded materials may be controlled to acceptable levels.

Suitable bonding may also be provided by utilizing mechanical interference between the first component and the second component. For example, the second composition may be chosen such that it has a greater shrinkage than the first composition, thus creating a shrinkage fit due to differential shrinkage as one composition may overlie or at least partially surround the other, as illustrated by FIG. 14A. In that regard, the first composition may have a volumetric shrinkage that is in the range of about 1% to 10% less than the shrinkage of the second composition, including all values and increments therein. It should be appreciated that the volumetric shrinkage may be isotropic or anisotropic.

FIG. 14A is a side view of the first component 12 after it has been molded. It may include a projecting portion 16 which may include one or more depressions or through holes 18. The projecting portion 16 may become at least partially surrounded by the second composition as the second component 14 is being formed. Due to shrinkage, melt bonding or solubility, the two compositions may adhere together along the surfaces of the projecting portion and in the vicinity of reference numeral 20. FIG. 14B is an end view of the first component 12 looking from the left side of FIG. 14A. Using the methods of the present invention, dissimilar materials, compositions, shapes, etc. may be combined and attached through an insert molding process.

The present invention has been set forth in reference to specific exemplary embodiments, but it should be understood by those skilled in the art that such exemplary embodiments are by way of illustration only. Modifications and variations will therefore be apparent and may be resorted to without departing from the spirit and equivalent scope of this invention. Accordingly, such modifications and equivalents should be considered to be within the purview of the scope of the invention as set forth in the appended claims.

What is claimed is:

1. A process for manufacturing a multi-layer pet treat comprising the steps of:
   (a) providing at least one moveable mold portion and a plurality of stationary mold portions, wherein the mating of the moveable mold portion to each of the plurality of stationary mold portions produces cavity spaces there-between of succeedingly greater volume;
   (b) providing a plurality of injection molding machines aligned in fluid connection with each of the stationary mold portions;
   (c) providing a plurality of edible compositions which are processible through said injection molding machines including at least one of a textured vegetable protein;
   (d) moving said moveable mold portion to align with a first of said plurality of stationary mold portions and injecting a first edible composition from a first injection molding machine into the cavity space formed between the aligned mold portions to form a first layer having a surface temperature ($ST_1$);

(e) moving said moveable mold portion and said first layer to align with a second of said plurality of stationary mold portions thus providing a cavity space between said second stationary mold portion and said first layer;

(f) injecting a second edible composition from a second injection molding machine into the cavity space formed in (e) above to form a second layer, wherein said second edible composition is at a temperature $T_2$, wherein said second edible composition differs in nutritional and compositional properties from said first layer;

(g) allowing said second layer to form in disposed relationship at least partially overlying a portion of said first layer and forming a layered pet treat wherein $ST_1 < T_2$ wherein said temperature control is regulated so that said first edible composition and said second edible composition remain layered during said injection molding and said second edible composition does not freeze upon contact with said first edible composition, and wherein said first edible composition is selected to have a solubility parameter $\delta_1$ that is within +/−5 units (cal./cm$^3$) of the solubility parameter $\delta_2$ of said second edible composition.

2. The process of claim 1 wherein the materials are formed to be adjacent to one another in overlying, surrounding, partially surrounding, abutting or interlocked relationship.

3. The process of claim 1 wherein the $ST_1$ is not more than 50° C. lower in temperature than $T_2$.

4. The process of claim 1 wherein $ST_1$ is 5-50° C. lower than $T_2$.

5. A process for manufacturing a multi-layer pet treat comprising the steps of:

(a) providing at least one moveable mold portion and a plurality of stationary mold portions, wherein the mating of the moveable mold portion to each of the plurality of stationary mold portions produces cavity spaces there-between of succeedingly greater volume;

(b) providing a plurality of injection molding machines aligned in fluid connection with each of the stationary mold portions;

(c) providing a plurality of edible compositions which are processible through said injection molding machines including at least one of a textured vegetable protein;

(d) moving said moveable mold portion to align with a first of said plurality of stationary mold portions and injecting a first edible composition from a first injection molding machine into the cavity space formed between the aligned mold portions to form a first layer having a surface temperature ($ST_1$);

(e) moving said moveable mold portion and said first layer to align with a second of said plurality of stationary mold portions thus providing a cavity space between said second stationary mold portion and said first layer;

(f) injecting a second edible composition from a second injection molding machine into the cavity space formed in (e) above to form a second layer, wherein said second edible composition is at a temperature $T_2$, wherein said second edible composition differs in nutritional, and compositional properties from said first layer;

(g) allowing said second layer to form in disposed relationship at least partially overlying a portion of said first layer and forming a layered pet treat, wherein one of said first or second layer comprises a textured vegetable protein and wherein $ST_1$ is about 5-50° C. lower in temperature than $T_2$ wherein said temperature control is regulated so that said first edible composition and said second edible composition remain layered during said injection molding and said second edible composition does not freeze upon contact with said first edible composition and wherein the first and second layer are melt bonded, and wherein said first edible composition is selected to have a solubility parameter $\delta_1$ that is within +/−5 units (cal./cm$^3$) of the solubility parameter $\delta_2$ of said second edible composition.

\* \* \* \* \*